July 31, 1934.  N. A. MINER  1,968,701
BRAKE EQUIPMENT FOR AUTOMOTIVE VEHICLES
Filed May 9, 1932
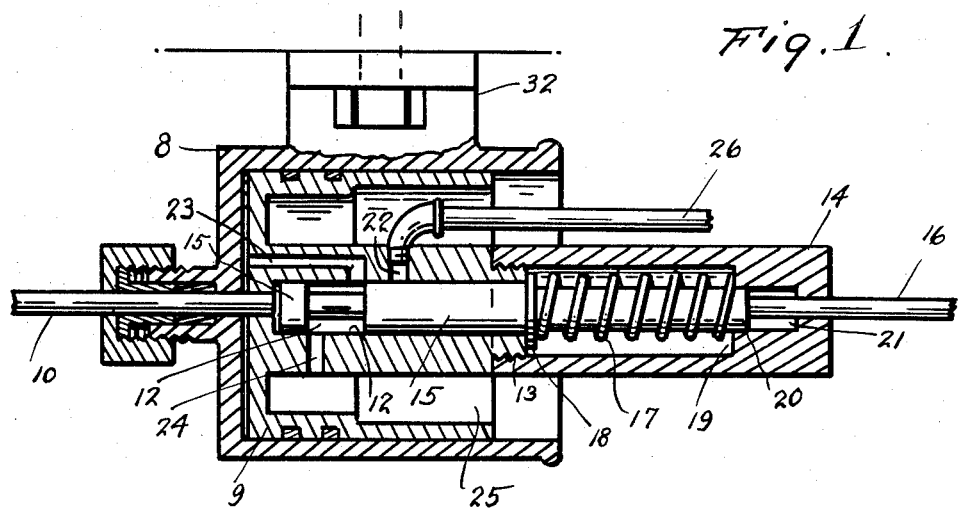
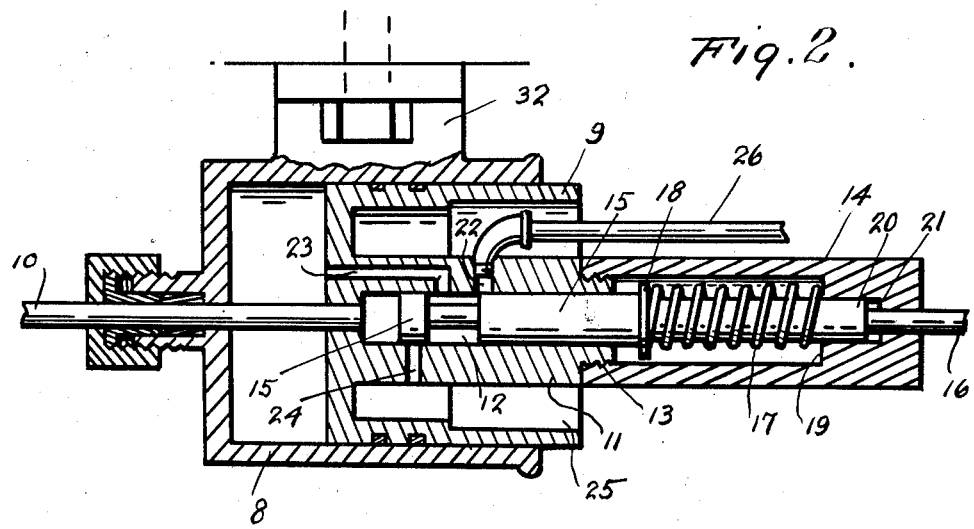
Inventor
N. A. Miner
By Clarence A. O'Brien
Attorney Patented July 31, 1934

1,968,701

UNITED STATES PATENT OFFICE

1,968,701

BRAKE EQUIPMENT FOR AUTOMOTIVE VEHICLES

Nelson A. Miner, San Antonio, Tex.

Application May 9, 1932, Serial No. 610,187

1 Claim. (Cl. 121—41)

This invention relates to brake equipment for automotive vehicles such as automobiles, buses, trucks, and the like and in accordance with the present invention improved means is provided for applying the wheel brakes of the vehicle in an effective and efficient manner, and whereby to obtain maximum braking power from a minimum amount of manual effort.

The invention together with its numerous objects and advantages will be best understood from a study of the following description, taken in connection with the accompanying drawing wherein:

Figure 1 is a longitudinal sectional elevational view of a cylinder, piston, and associated parts embodying the features of the present invention and showing the position of the piston when the wheel brakes are released.

Figure 2 is a view showing the position of the piston when the wheel brakes are applied.

Referring more in detail to the drawing it will be seen that the invention resides in the provision of a servo-motor adapted for use to apply the brakes of a vehicle, and in the present instance consists of a fixed cylinder 8 having a piston 9 mounted for reciprocation therein and provided with a rod 10 that is adapted to be connected in any suitable manner with the brake mechanism of an automobile. The piston 9 is also provided with a body 11 having an axial bore 12 and at that end remote from the stem 10 an integral threaded pin 13 with which is screw threadedly connected a hollow stem 14. A piston valve 15 is mounted for reciprocation in the bore 12 and is provided with a relatively elongated stem or rod 16 that at its free end is adapted to be operatively connected with the usual brake pedal (not shown). Shifting of the piston valve 15 in one direction upon pressing of the brake pedal is resisted by a coil spring 17 arranged in the stem 14 and bearing against a shoulder 18 on the piston valve 15 and also against a shoulder 19 provided internally of the stem 14. Movement of the piston valve 15 in one direction is limited by abutment of the shoulder 20 on the piston valve with a shoulder 21 provided interiorly of the stem 14.

Leading laterally from the bore 12 of the piston 9 are ports 22, 23 arranged on one side of the bore 12, and a port 24 arranged on a relatively opposite side of the bore.

In actual practice the piston 9 is provided with a circular recess forming an exhaust passage 25.

Air under pressure is conducted through a conduit pipe 26 from a suitable source of supply to the bore 12, the pipe 26 being coupled to the port 22 as shown in the drawing.

From the description thus far it will be seen that in actual practice when the brakes are released the parts are in the position shown in Figure 1. In applying the brake, the brake pedal is depressed in the usual manner whereupon the piston valve 15 is shifted to substantially the position shown in Figure 2 for opening port 22, and closing port 24 whereupon air under pressure will pass from the pipe 26 through the bore 12 around the reduced portion of valve piston and through the port 23 in the cylinder 8 to act on the piston 9 thereby moving it from the position shown in Figure 1 to the position shown in Figure 2 resulting in an application of the brakes. To release the brakes, the brake pedal is made free and will return to its normal position by the spring devices (not shown) and usually provided for that purpose with conventional mechanical brake equipment; and upon release of the pedal the piston valve 15 under action of spring 17 will move to the position suggested in Figure 1 whereupon the air in the cylinder 8 will pass through the port 23 around the reduced portion of the valve 15, and through the port 24 to exhaust through the passage 25 thus permitting the piston 9 to return to its normal position or the position shown in Figure 1 upon release of the brakes.

Should the fluid power for operating the piston 9 fail, or for any reason it is desired to manually control the application of the brakes, it will be seen that the brakes may be directly operated from the foot pedal; and in this connection it will be noted that when the foot pedal is depressed to exert a pull on rod 16 the shoulder 20 on the rod will be brought into engagement with the shoulder 21 of the valve stem 14, and continued movement of the rod 16 will of course cause the piston to move in the same direction thus exerting a pull on the rod 10, resulting in application of the brakes in a manner apparent. It is also to be understood that if at any time manual power is desired to supplement the fluid pressure, the operator can, by pressing forwardly on the foot pedal engage shoulders 20, 21 and thereby add the pressure of his physical strength to that applied by the fluid pressure.

In actual practice the cylinder 8 is provided with a suitable flange or part 32 adapted to be bolted or otherwise attached to a suitable part of the chassis frame of the automobile as suggested in Figures 1 and 2.

Even though I have herein shown and described the preferred embodiment of the invention, it is to be understood that I do not wish to limit myself to the precise details of construction, combination and arrangement of elements as herein shown, but claim all such forms of the invention to which I am entitled in view of the requirements of the prior art and the scope of the appended claim.

Having thus described my invention, what I claim as new is:

A servo-motor comprising a fixed cylinder closed at one end and open at an opposite end, a piston mounted for reciprocation within said cylinder, said piston being provided with a circular exhaust passage opening at one end of the piston, said piston being also provided with an axial bore, a hollow stem for the piston screw threadedly connected therewith in substantial alinement with the bore, radial ports in the piston arranged in different positions relative to one another in the longitudinal direction of the piston, a fluid supply conduit rigidly connected at one end with the piston in line with one of said ports, and the other of said ports connecting said bore with said exhaust passage, a passage extending longitudinally of the piston and opening at one end into the cylinder, and at an opposite end opening into said bore, a valve member arranged to reciprocate within said bore for controlling said ports, spring means within said stem and engaged with said valve for normally urging the same to shift in one direction relative to the piston, and interengaging shoulders on said valve and said stem for limiting movement of the valve member in one direction relative to said piston, and means connected with said valve for shifting it against the action of said spring.

NELSON A. MINER.